US012296307B2

(12) United States Patent
Brauer et al.

(10) Patent No.: US 12,296,307 B2
(45) Date of Patent: May 13, 2025

(54) FLOW CONTROL DEVICE (71) Applicant: OZONE 1 PTY LTD, Nerang (AU)

(72) Inventors: David Brauer, Gold Coast (AU); Joel Harvey, Gold Coast (AU); Valeri Orlingis, Brisbane (AU)

(73) Assignee: OZONE 1 PTY LTD, Nerang (AU)

( * ) Notice: Subject to any disclaimer, the term of this patent is extended or adjusted under 35 U.S.C. 154(b) by 965 days.

(21) Appl. No.: 17/290,983

(22) PCT Filed: Nov. 5, 2019

(86) PCT No.: PCT/AU2019/051215
§ 371 (c)(1),
(2) Date: May 3, 2021

(87) PCT Pub. No.: WO2020/093091
PCT Pub. Date: May 14, 2020

(65) Prior Publication Data
US 2022/0072488 A1  Mar. 10, 2022

(30) Foreign Application Priority Data
Nov. 6, 2018 (AU) ................................ 2018904231

(51) Int. Cl.
*C02F 1/68* (2023.01)
*B01F 25/312* (2022.01)
*B01F 101/00* (2022.01)

(52) U.S. Cl.
CPC ............ *B01F 25/312* (2022.01); *C02F 1/686* (2013.01); *B01F 25/312511* (2022.01);
(Continued)

(58) Field of Classification Search
CPC ........................................................ C02F 1/686
(Continued)

(56) References Cited

U.S. PATENT DOCUMENTS 1,086,226 A    2/1914  Sassano
1,908,432 A    5/1933  Seth
(Continued)

FOREIGN PATENT DOCUMENTS

CN    204628396 U    9/2015
CN    204729750 U    10/2015
(Continued)

OTHER PUBLICATIONS

International Search Report and Written Opinion mailed Feb. 24, 2020, in connection with International Patent Application No., PCT/AU2019/051215, filed Nov. 5, 2019, 16 pgs.
(Continued)

*Primary Examiner* — David L Sorkin
(74) *Attorney, Agent, or Firm* — Chiesa Shahinian & Giantomasi PC (57) ABSTRACT

A flow control device comprising a body having an inlet in a first end thereof, an outlet in a second end thereof, and a passageway extending between the inlet and the outlet, the flow control device further comprising an injection assembly located at least partially within the passageway such that at least a portion of a fluid flowing through the device passes through the injection assembly, and wherein the flow control device further comprises a flow control portion adapted to control the proportion of the fluid that passes through the injection assembly in response to one or more parameters.

14 Claims, 8 Drawing Sheets

(52) U.S. Cl.
CPC .............. *B01F 25/312512* (2022.01); *B01F 2101/2204* (2022.01); *C02F 1/685* (2013.01)

(58) Field of Classification Search
USPC ............ 366/163.2; 137/115.11, 115.13, 895
See application file for complete search history.

(56) References Cited

U.S. PATENT DOCUMENTS

| | | | |
|---|---|---|---|
| 2,357,673 A | 9/1944 | Lee | |
| 2,912,000 A * | 11/1959 | Green | F16K 17/04 |
| | | | 137/533.19 |
| 3,011,443 A * | 12/1961 | Nielsen | F04F 5/461 |
| | | | 417/167 |
| 3,049,303 A * | 8/1962 | Kocher | B05B 1/1663 |
| | | | 239/312 |
| 3,188,055 A * | 6/1965 | Lutjens | B01F 35/2213 |
| | | | 137/892 |
| 3,282,227 A | 11/1966 | Adolph | |
| 3,590,851 A * | 7/1971 | Bogossian | F16K 15/20 |
| | | | 137/223 |
| 4,019,983 A | 4/1977 | Mandt | |
| 4,105,187 A | 8/1978 | Huber | |
| 5,041,246 A | 8/1991 | Garrison | |
| 5,427,151 A | 6/1995 | Pauley | |
| 2005/0218054 A1 | 10/2005 | Sakata et al. | |
| 2009/0073800 A1 | 3/2009 | Tarmann et al. | |
| 2011/0095222 A1 | 4/2011 | Flores et al. | |
| 2013/0020521 A1 | 1/2013 | Byrne | |
| 2016/0115845 A1 | 4/2016 | Fujita et al. | |

FOREIGN PATENT DOCUMENTS

| | | |
|---|---|---|
| EP | 2854955 B1 | 7/2018 |
| FR | 2459679 A1 | 1/1981 |
| GB | 191314471 A | 6/1914 |
| GB | 136962 A | 12/1919 |
| GB | 341918 A | 1/1931 |
| WO | 2009095704 A2 | 8/2009 |

OTHER PUBLICATIONS

International Preliminary Report on Patentability (Chapter II) mailed Oct. 7, 2020, in connection with International Patent Application No. PCT/AU2019/051215, filed Nov. 5, 2019, 6 pgs.

Extended European Search Report mailed Jul. 15, 2022 in connection with European Patent Application No. 19882430.2, 7 pgs.

* cited by examiner

FLOW CONTROL DEVICE

CROSS-REFERENCE TO RELATED APPLICATIONS

This application is a national stage under 35 U.S.C. 371 of International Patent Application No. PCT/AU2019/051215, filed Nov. 5, 2019, which claims priority to Australian Patent Application No. 2018904231, filed Nov. 6, 2018, the disclosures of which are incorporated herein by reference in their entirety.

TECHNICAL FIELD

The present invention relates to a flow control device. In particular, the present invention relates to a combined flow control and dosing device, and parts thereof.

BACKGROUND ART

The controlled addition or mixing of additives to a fluid stream (such as gaseous or liquid chemicals or the like) is common in many industries and applications such as, but not limited to, mining, oil and gas, water treatment, food production and the like.

It is well-known to add additives to a fluid stream using a Venturi injector. In these installations, the additives enter a motive fluid stream via vacuum suction created by the Venturi device. However, the suction rate of a Venturi is proportional to the flow rate of the medium therethrough. This creates a challenge when a fixed rate of dosing and/or suction is required regardless of the flow rate through the Venturi.

Figure 1:
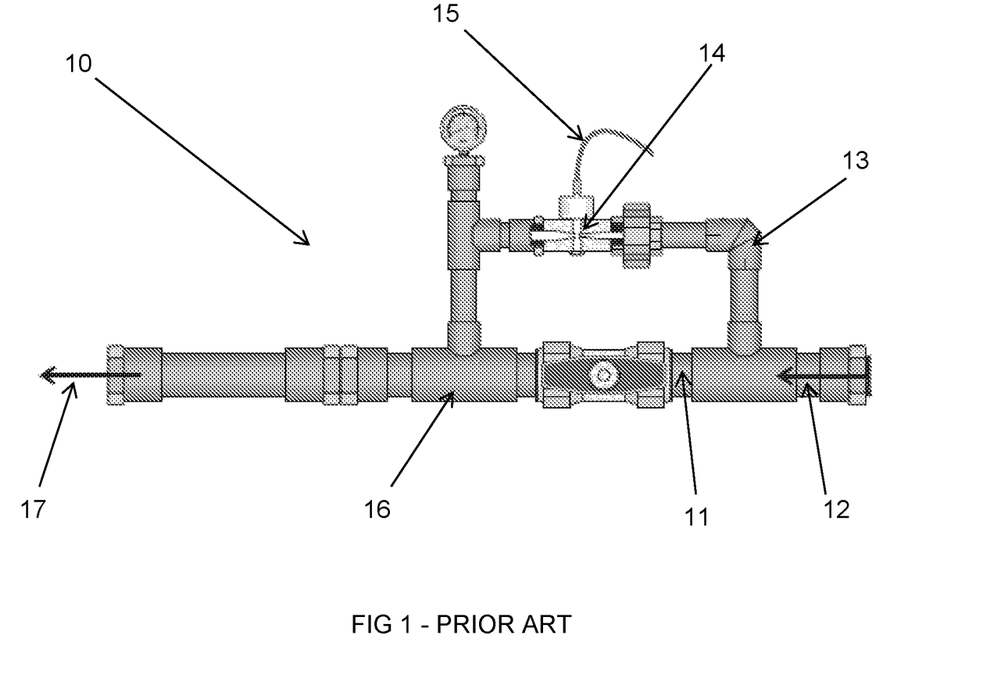
FIG. 1 illustrates a prior art Venturi pressure bypass installation.

Some attempts have been made to overcome this issue. For instance, Venturi injector bypass installations, such as that shown in FIG. 1, are commonly used to control the motive flow driving the vacuum suction using manual valves, spring valves, booster pumps or the like. However, these bypass installations require the use of a large number of parts which in turn increases the capital and maintenance costs, the footprint of the installation, its reliability and the assembly time. In addition, bypass installations suffer from the drawback of placing unwanted back pressure on associated pumps due to frictional and static losses that are required to control the motive flow in the bypass. Further, existing bypass installations are unable to maintain an ideal pressure ratio across the Venturi if the motive flow speed or pressure changes significantly, such as when used in conjunction with a variable speed pump. Still further, existing bypass installations require the use of a significant length of conduit in order to operate, which makes them less efficient due to drag forces from the inner walls of the conduit.

Thus, there would be an advantage if it were possible to provide a flow control device that provided effective mixing and/or mass transfer, even when used with a variable speed pump, without suffering from the drawbacks of conventional bypass installations.

In addition, conventional Venturi injectors themselves suffer from a shortcoming in the form of the one-way check valves that are typically incorporated into the suction port thereof. Typically, a ball and spring type valve is used in this location, and while these valves provide desirable low opening pressure, this results in a compromise when it comes to low back pressure sealing, in that conventional Venturi injectors are prone to leakage through a suction port in situations in which a very low back pressure exists (e.g. less than 0.1 psi).

In light of the above, there would be an advantage if it were possible to provide a valve, or valve assembly, that minimised or eliminated leakage in situations of low back pressure.

It will be clearly understood that, if a prior art publication is referred to herein, this reference does not constitute an admission that the publication forms part of the common general knowledge in the art in Australia or in any other country.

SUMMARY OF INVENTION

The present invention is directed to a flow control device which may at least partially overcome at least one of the abovementioned disadvantages or provide the consumer with a useful or commercial choice.

With the foregoing in view the present invention, in one form, resides broadly in a flow control device comprising a body having an inlet in a first end thereof, an outlet in a second end thereof, and a passageway extending between the inlet and the outlet, the flow control device further comprising an injection assembly located at least partially within the passageway such that at least a portion of a fluid flowing through the device passes through the injection assembly, and wherein the flow control device further comprises a flow control portion adapted to control the proportion of the fluid that passes through the injection assembly in response to one or more parameters.

The flow control device may be of any suitable size, shape or configuration, and it will be understood that the size and shape of the flow control may vary depending on the duty to which the flow control device is to be put. For example, the flow control device may be scaled up or down depending on the velocity, volume and/or pressure of fluid flow that is to be encountered in a particular situation.

The body may be of any suitable configuration. Preferably, however, the body may be substantially tubular between inlet and the outlet. The body may be of any suitable cross-sectional shape, although in a preferred embodiment of the invention, the body may be substantially circular in cross-section.

The body may be of any shape. However, in a preferred embodiment of the invention, the body may be substantially linear. Similarly, it is envisaged that the passageway may be substantially linear.

Preferably, the inlet and the outlet may be located at opposed ends of the body. Thus, in embodiments of the invention in which the passageway is substantially linear, the inlet and the outlet may be provided in the same orientation as one another in opposed ends of the linear body.

The passageway may be of substantially the same diameter along its entire length. Alternatively, the diameter of the passageway may change along its length. For instance, the passageway may include one or more regions of different diameter, such that the passageway may have two or more diameters along its length. In some embodiments of the invention, at least a portion of the length of the passageway may taper or widen between the inlet and the outlet. In an alternative embodiment, a region having a different diameter to the remainder of the passageway may be provided. In this embodiment of the invention, it is envisaged that the region may be a region with which the flow control portion may be associated.

The body may be fabricated from any suitable material. For instance, the body may be fabricated from metal, polymeric material, fibreglass, glass or the like, or any suitable combination thereof. In a preferred embodiment of the invention, however, the body may be fabricated from a material that is resistant to one or more of the following: heat, corrosion, chemicals, UV or abrasion. In a preferred embodiment of the invention, the body is at least partially fabricated from a polymeric material, or combination of polymeric materials.

As previously stated, the injection assembly is located at least partially within the passageway. The injection assembly may be of any suitable size shape or configuration, although it is envisaged that the injection assembly may include an injector body, the injector body having an injector inlet at a first end thereof, an injector outlet at a second end thereof, and an injector passageway extending between the injector inlet and the injector outlet.

Preferably, the injector body may be substantially tubular between the injector inlet and the injector outlet. The injector body may be of any suitable cross-sectional shape, although in a preferred embodiment of the invention, the injector body may be substantially circular in cross-section.

In a preferred embodiment of the invention, at least the injector body of the injection assembly may be located within the passageway. The injector body and the body may be located at any suitable orientation to one another, although in a preferred embodiment of the invention, the injector body and the body may be located substantially parallel to one another. More preferably, the injector body may be located both substantially parallel to the body and substantially centrally within the passageway. Thus, in this embodiment of the invention, the injector body may be located substantially co-axially with the passageway. The body and the injector body may be formed integrally with one another, or may be formed separately therefrom and adapted for fixed or removable attachment to one another.

In a preferred embodiment of the invention, the injector passageway may have a diameter that is smaller than the diameter of the passageway. Therefore, in embodiments of the invention in which the injector body is located substantially co-axially with the passageway, a substantially annular bypass flow path may be formed between an inner surface of the body and an outer surface of the injector body.

As previously stated, at least a portion of a fluid flowing through the device passes through the injection assembly. Thus, in this embodiment of the invention, it is envisaged that the at least a portion of the fluid flowing through the device enters the injection assembly through the injector inlet, passes along the injector passageway and exits the injection assembly through the injector outlet. Preferably, the portion of the fluid flowing through the device that does not flow through the injection assembly flows between the inlet and the outlet along the substantially annular bypass flow path between the inner surface of the body and the outer surface of the injector body.

Preferably, the injector inlet may be located closest to the first end of the body (i.e. the end of the body at which the inlet is located), while the injector outlet may be located closest to the second end of the body (i.e. the end of the body at which the outlet is located). Thus, fluid that enters the injection assembly flows in substantially the same direction as fluid flowing along the annular bypass flow path.

It is envisaged that the injection assembly may be used to inject a substance into the fluid. Any suitable substance may be injected, and it will be understood that the substance will depend on the duty in which the device is being used. For instance, in water treatment applications, the substance may include chlorine, ozone, an antiscalant substance, an antibacterial substance, a water softener, a pH modifier or the like. In mining or mineral processing applications, the substance may include an antiscalant substance, a pH modifier, or a reagent such as, but not limited to, a depressant, a collector, a frother, a flocculant or the like, or any suitable combination thereof. In some embodiments of the invention, the substance to be injected may include a gas or mixture of gases.

The substance may be injected into the fluid using any suitable technique. For instance, the substance may be pumped, blow, fed by gravity or otherwise introduced into the fluid. More preferably, however, the substance may be introduced into the fluid using an inlet port. In a preferred embodiment of the invention, the inlet port may comprise a suction port. The suction port may be located at any suitable orientation to the injector passageway, although in a preferred embodiment of the invention, the suction port may be oriented substantially perpendicular to the injector passageway. Thus, in this embodiment of the invention, the injection assembly may comprise a Venturi injection assembly. In a preferred embodiment, the Venturi injection assembly is configured to inject a substance into the fluid.

In some embodiments of the invention, a plurality of suction ports may be provided. Each suction port may introduce the same substance into the flow through the injection assembly, or a plurality of different substances may be introduced. For instance, a first suction port may be used to introduce a first substance, while a second suction port may be used to introduce a second substance, and so on.

It will be understood that, in order to function as a Venturi injection assembly, the injector passageway will comprises a constricted portion between the injector inlet and the injector outlet and adjacent the one or more suction ports, as well as a region of expanding diameter between the constricted portion and the injector outlet.

The operation of a Venturi injector is well understood, and no further discussion of the theory of the operation of this portion of the device is required.

In embodiments of the invention in which the injection assembly comprises a Venturi injection assembly, one or more injection inlets may be provided through which the substance (or a plurality of substances) passes in order to be introduced to the fluid. It is envisaged that the substance (or plurality of substances) will be introduced to the fluid passing through the injection assembly. Preferably, the one or more injection inlets may be in fluid communication with the one or more suction ports, and therefore the injector passageway.

The one or more injection inlets may be located at any suitable location. Preferably, however, the injection inlets may extend through a wall of the body. In this way, the injection inlets may include an opening in the wall of the body through which the substance (or substances) may be introduced to the fluid. In some embodiments of the invention, the injection inlets may extend from (or even beyond) the opening in the wall of the body to a suction port.

In some embodiments, a plurality of injection inlets may be provided along at least a portion of the length of the body. More preferably, however, a plurality of injection inlets may be provided along the portion of the body corresponding to the constricted portion of the injection passageway. The plurality of injection inlets may be associated with a plurality of suction ports, or may all be associated with a single suction port.

In embodiments of the invention in which a plurality of injection inlets are provided, it is envisaged that at least one of the plurality of injection inlets (and, more preferably, each of the plurality of injection inlets) may be provided with a substance flow control member. This may be particularly in embodiments of the invention in which a plurality of injection inlets are provided, all of which are associated with a single suction port. The substance flow control members may be of any suitable form, although in a preferred embodiment of the invention, the substance flow control members may be valves, and, in particular, isolation valves. It is envisaged that the substance flow control members may be actuated to control the injection rate of the substance into the fluid passing through the injection assembly. More preferably, the substance flow control members may be actuated to control the injection rate of the substance associated with the respective injection inlet into the fluid passing through the injection assembly.

Actuation of the substance flow control members may be achieved using any suitable technique. For instance, the substance flow control members may be actuated manually, or automatically. In embodiments of the invention, in which the substance flow control members are actuated automatically, the actuation of the substance flow control members may occur in response to the measurement of one or more parameters, such as, but not limited to, fluid flow rate, fluid pressure, fluid viscosity, fluid density, the viscosity or density of the substance being added to the fluid, the composition of at least one substance in the fluid leaving the device and the like, or any suitable combination thereof. Thus, in this embodiment of the invention, the device may be provided with one or more sensors adapted to measure the one or more parameters, and actuation of the substance flow control members may occur in response to the measurements taken by the one or more sensors.

It is envisaged that, by providing a plurality of injection inlets, multiple substances may be mixed into the fluid flowing through the injection assembly, thereby increasing maximum addition rates. In addition, the presence of a plurality of injection inlets may assist in providing the injection assembly with additional mechanical strength and/or support within the passageway.

Preferably, each of the one or more injection inlets may be associated with a source of one or more substances. The injection inlets may be associated with the source of the one or more substances in any suitable manner. For instance, the injection inlets may be provided with a connection portion adapted to operatively connect the injection inlet with the source of the substance. Any suitable connection portion may be provided, such as a screw-threaded portion, a nipple, a fitting such as a hose coupling, pipe fitting or the like. In alternative embodiments of the invention, an inlet line (such as a hose, pipe or the like) may be joined to the injection inlet, such as by welding, brazing or the like, or through the use of adhesives.

In some embodiments of the invention, the injection inlets may be provided with one or more flow control members. Preferably, the flow control members may be adapted to reduce or eliminate the possibility of fluid flowing through the injector passageway from passing through the injection inlets.

The one or more flow control members may be of any suitable form. However, in a preferred embodiment of the invention, the one or more flow control members may comprise one or more valves including one or more check valves and, in particular, one or more one-way check valves.

Any suitable check valve may be used, and in some embodiments of the invention a plurality of check valve may be provided. In these embodiments, the plurality of check valves may be placed in any suitable orientation to one another, although it is preferred that the plurality of check valves may be effectively stacked relative to one another within the injection inlet. Thus, it is envisaged that, by stacking the plurality of check valves on top of one another, any fluid that enters the injection inlet through the suction port would need to pass through every check valve before it can exit the device through the opening. It is envisaged that the likelihood of this occurring is remote.

The check valves may be of any suitable configuration, although the check valves preferably include a valve member moveable relative to a valve seat. Preferably, the valve member provides a seal against the valve seat so as to prevent the flow of fluid through the valve. In some embodiments of the invention, the valve member may move relative to the valve seat in response to pressure exerted on the valve member, such as pressure created by the flow of fluid into the check valve. It is envisaged that an increase in the pressure exerted on the valve member will move the valve member away from the valve seat and out of sealing engagement with the valve seat, whereas a decrease in the pressure exerted on the valve member will allow the valve member to move towards, and into sealing engagement with, the valve seat.

In some embodiments, the check valve may be provided with one or more biasing members. It is envisaged that the biasing members may be associated with the valve member in such a manner that the natural bias of the one or more biasing members biases the valve member towards the valve seat. Thus, in this embodiment of the invention, the pressure exerted on the valve member must be sufficient to overcome the natural bias of the biasing members in order to move the valve member out of engagement with the valve seat.

The biasing members may be of any suitable form, although in a preferred embodiment of the invention, the biasing member comprise springs, such as, but not limited to, helical springs, for instance helical compression springs.

It is envisaged that, unlike conventional check valves, only a relatively small, or even no, back pressure may be required for the valve member of the present invention to form a seal against the valve seat. Preferably, the seal formed between the valve member and the valve seat may be an air-tight and/or water-tight seal. For instance, it is envisaged that a back pressure of no more than 100 Pa may be sufficient for the valve member to form a seal against the valve seat. More preferably, a back pressure of no more than 50 Pa may be sufficient for the valve member to form a seal against the valve seat. Still more preferably, a back pressure of no more than 25 Pa may be sufficient for the valve member to form a seal against the valve seat. Most preferably, a back pressure of no more than 10 Pa may be sufficient for the valve member to form a seal against the valve seat. This is in comparison to conventional check valves in which a minimum drip proof back pressure of at least 3.4 kPa may be required to form an air-tight and/or water-tight seal between the valve member and the valve seat.

In typical check valves, at least four times the sealing pressure may be required in order to open the valve. However, it is not uncommon for some valves to require between 10 times and 100 times the sealing pressure to open the valve. The pressure required to open a conventional check valve is typically in the order of approximately 6.9 kPa to 27.6 kPa.

The check valve of the present invention overcomes this limitation by reducing the spring pressure required to close the valve, thereby also reducing the fluid pressure required to open the valve (and thus the open to close ratio of the valve). Specifically, in the present invention, it is envisaged that the valve may open at pressures of no more than 2.1 kPa, more preferably at no more than 1.4 kPa, and yet more preferably at no more than 0.7 kPa.

In some embodiments, the valve member may include a resiliently deformable portion. Preferably, the resiliently deformable portion may be fabricated from a resiliently deformable material such that, when the valve member is brought into abutment with the valve seat, the resiliently deformable material may deform so as to enhance the seal between the valve member and the valve seat.

The resiliently deformable portion may be formed separately from the valve member and adapted for connection thereto, or may be formed integrally with the valve member. In the latter embodiment, the valve member may be at least partially fabricated from a resiliently deformable material so that the resiliently deformable portion may be formed as part of the valve member. Alternatively, the valve member may be provided with one or more sealing members that form the resiliently deformable portion. Any suitable sealing members may be provided, although it is envisaged that the sealing members may be adapted to enhance the seal between the valve member and the valve seat in order to reduce or eliminate the back flow of fluid through the valve.

The one or more sealing members may be of any suitable form. Preferably, however, the one or more sealing members may be fabricated from a resiliently deformable material such that, when brought into engagement with the valve seat, the one or more sealing members may deform against the valve seat in order to enhance the seal therebetween. In some embodiments, the one or more sealing members may be fabricated from rubber or a synthetic polymeric material. In a preferred embodiment of the invention, the one or more sealing members may include annular members that are placed around the circumference of the valve member. Thus, in some embodiments of the invention, the one or more sealing members may comprise one or more O-rings, gaskets or the like.

The valve seat may be of any suitable construction. Preferably, however, the valve seat may be provided with a plurality of raised portions. The plurality of raised portions may be of any suitable form, such as one or more ridges, projections, stepped portions (and particularly micro-stepped portions) or the like. However, it will be understood that the purpose of the raised portions may be to enhance the seal between the valve member (and, more preferably, the one or more sealing members) and the valve seat. Preferably, the seal may be enhanced with reduced pressure from the biasing member compared to conventional check valves. In turn, this allows the valve to open when subject to lower pressures (i.e. "cracking" pressure) than conventional check valves.

In particular, it is envisaged that the plurality of raised portions may be adapted to reduce the surface area of the sealing member that is brought into contact with the valve seat. This has the effect of increasing the deformation of the sealing member against the valve seat (preferably with reduced force from the biasing member), thereby enhancing the seal between the valve member and the valve seat (preferably without compromising relatively low opening pressures). In addition, the presence of the plurality of raised portions on the valve seat reduces the pressure exerted on the valve seat by the biasing member that is required to deform the sealing member. In this way, the effectiveness of the seal between the valve member (and, more specifically, the sealing members) and the valve seat may be improved (preferably while simultaneously reducing the minimum force required to open the valve due to the lower powered biasing member).

In embodiments of the invention in which the valve seat is provided with a plurality of stepped portions, it is envisaged that the stepped portions may each include a first face positioned substantially perpendicular to the direction of flow of fluid through the valve seat, and a second face extending substantially parallel to the direction of flow of fluid through the valve seat. Preferably, the second face of each stepped portion is adapted to interconnect first faces of adjacent stepped portions.

Thus, in a second aspect, the invention resides broadly in a check valve comprising a valve member including a resiliently deformable portion, and a valve seat provided with a plurality of raised portions, wherein the valve member is adapted for movement between an open condition and a closed condition in which the resiliently deformable portion is brought into sealing abutment with the plurality of raised portions on the valve seat.

As previously stated, the one or more check valves may be located in the injection inlet. The check valves may be adapted to be retained in the injection inlet. For instance, the check valves may be held in frictional engagement with an inner surface of the injection inlet. Alternatively, one or more fasteners, adhesives or the like may be used to retain the check valves within the injection inlet. In other embodiments of the invention, the injection inlet may be provided with a retention member adapted to reduce or preclude movement of the one or more check valves relative to the injection inlet. Any suitable retention member may be provided, such as, but not limited to, a cap member associated with the opening to the injection inlet. The cap member may be associated with the opening to the injection inlet using any suitable technique, such as, but not limited to, a frictional engagement, screw-threaded engagement, hinged or pivoting engagement, through the use of one or more fasteners, clamps, clips or the like, or any suitable combination thereof.

Each of the one or more check valves may be formed independently to one another. In an alternative embodiment of the invention, when a plurality of check valves are present, the plurality of check valves may be formed with a monolithic body and a plurality of valve members located within the monolithic body. In this embodiment of the invention, the monolithic body may be formed with a number of valve seats equal to the number of valve members present in the plurality of check valves. In some embodiments of the invention, the plurality of valve members may be formed integrally with one another.

In a preferred embodiment of the invention, at least the first end of the body, and optionally the second end of the body, may be provided with one or more flow adjustment members. The one or more flow adjustment members may be of any form. For instance, the flow adjustment members may comprise one or more vanes, baffles, limbs or the like. Preferably, the flow adjustment members at the first end of the body may be provided in order to reduce turbulence in the fluid entering the device through the inlet. Where present, flow adjustments members at the second end of the body may be provided to increase turbulence (and therefore mixing) of fluid exiting the injection assembly and/or the annular bypass flow path. In this way, the substance introduced into the fluid through the injection assembly may be more evenly distributed throughout the fluid. Most preferably, the substance is substantially homogenously distributed within the fluid exiting the device.

The flow adjustment members may be of any suitable shape and size. However, it will be understood that the flow adjustment members may be shaped and/or sized in such a manner as to promote certain flow conditions for fluid entering the device through the inlet and/or fluid leaving the device through the outlet. For instance, as mentioned previously, the flow adjustment members located at or adjacent the inlet may be provided with a shape that reduces turbulence in the fluid entering the passageway in order to ensure that a desired quantity of fluid enters the injection assembly, while a desired quantity of fluid passes along the annular flow path surrounding the injection assembly. Similarly, the flow adjustment members at or adjacent the outlet of the device may be provided with a shape that increases turbulence in order to more evenly distribute the substance within the fluid leaving the device through the outlet. While this is one example of how the flow adjustment members may be used, it will be understood that the flow adjustment members may either decrease or increase the turbulence of the fluid when placed at either the inlet or outlet ends of the device depending on the operating requirements or conditions of the device.

Preferably, the flow adjustment members comprise elongate members. The elongate members may be located so as to extend substantially parallel to the passageway. The flow adjustment members may be provided with any suitable shape that increases and/or decreases turbulence. It is envisaged that, in some embodiments, the flow adjustment members may be provided with a face, region or profile that either decreases or increases the turbulence of the fluid. In embodiments of the invention in which the flow adjustment members include a face or region that increases or decreases the turbulence of the fluid, it is envisaged that the flow adjustment members may be oriented within the passageway such that fluid impacts upon the face or region, thereby adjusting the flow characteristics of the fluid. Any suitable shape may be used for the flow adjustment member in this embodiment, such as, but not limited to, approximately triangular, conical, pyramidal, pentagonal or the like. Alternatively, the flow adjustment member may be in the form of an irregular polygon configured to adjust the flow characteristics of the fluid.

In embodiments of the invention in which the flow adjustment member is provided with a profile that adjust the flow characteristics of the fluid, any suitable profile may be used. For instance, the flow adjustment member may be provided with a teardrop or airfoil profile.

In a preferred embodiment of the invention, the flow adjustment members may be shaped such that, when placed in a first orientation, the flow adjustment members may increase the turbulence of fluid flowing over, around, past or along (hereinafter referred to collectively as "over" for simplicity) the flow adjustment members, while when placed in a second orientation, the flow adjustment members may decrease the turbulence of fluid flowing over the flow adjustment members. Thus, in a preferred embodiment of the invention, reversing the orientation of the flow adjustment members within the passageway may result in generating the opposite flow conditions. In other words, when placed in a first orientation the flow adjustment members may increase the turbulence of fluid flowing over the fluid adjustment members, while when placed in an opposed second orientation the flow adjustment members may decrease the turbulence of fluid flowing over the fluid adjustment members.

In embodiments of the invention in which the flow adjustment members are associated with end members, it is envisaged that the orientation of the flow members may be adjustable relative to the end member. In this way, a user may change the orientation of the flow adjustment members (for instance, by pivoting the flow adjustment members, disconnecting them from the end member and then reconnecting them in the opposite orientation etc.) in order to change the flow conditions generated by the flow adjustment members.

In an alternative embodiment of the invention, the orientation of the flow adjustment members relative to the end members may not be adjustable. Instead, the end members may be connected to the body in different orientations depending on the flow conditions that the user wishes to generate within the device. In this way, it is envisaged that all end members may be substantially identical and a user must simply change the orientation of the end member relative to the body depending on the flow conditions that are desired.

In some embodiments of the invention, the flow adjustment members may be located so as not to be substantially parallel with the passageway. Instead, the flow adjustment members may be angled upwardly or downwardly relative to the longitudinal axis of the passageway. In this manner, the direction of the flow of fluid through the passageway may be adjusted or controlled in order to direct more (or less) fluid through the injection assembly and/or to adjust the friction drag coefficient for particular fluids. Adjusting the friction drag coefficient may be beneficial in that it may promote improved mixing of the fluid, for example to more evenly distribute the substance within the fluid.

The flow adjustment members may be located at the inlet and/or the outlet of the device. More preferably, the flow adjustment members extend along at least a portion of the length of the passageway. In some embodiments of the invention, the flow adjustment members may be located within the passageway and spaced inwardly from the inlet and/or the outlet. It will be understood that the term "spaced inwardly" means that the flow adjustment members are positioned inwardly from the inlet and/or the outlet towards the centre of the body. In a preferred embodiment of the invention, the flow adjustment members may be spaced apart about the inner circumference of the passageway. The flow adjustment members may extend radially inwardly towards the centre of the passageway from at or adjacent the inner surface of the passageway.

The flow adjustment members may be formed integrally with the body, or may be formed separately therefrom and adapted for fixed or removable connection thereto. In one embodiment of the invention, the flow adjustment members may be formed with an end member. In a preferred embodiment of the invention, an end member may be associated with the first end of the body, although a further end member may also be associated with the second end of the body. Most preferably, an end member is associated with each of the first end and the second end of the body.

The end members may be of any suitable size, shape and configuration. Preferably, however, the end members are adapted to be at least partially received in the passageway through the opening at the respective end of the body. Preferably, the end members are retained within the passageway. The end members may be retained within the passageway using any suitable technique, such as one or more fasteners (e.g. mechanical fasteners such as screws, nails, bolts, rivets or the like), adhesives (such as, but not limited to, PVC cement, PVC solvent cement/glue etc.) or the like. Alternatively, the end members may be provided with a screw-threaded portion adapted to screw-threadedly engage with a complementary screw-threaded portion provided on an inner surface of the body. In other embodiments, the end members are adapted to be retained in frictional engagement with the body. Specifically, the end members may be of a complementary shape and size to the body such that an outer surface of the end members is retained in frictional engagement with an inner surface of the body. In some embodiments, it may be the end member may be retained in sealing engagement with the body. In these embodiments of the invention, it is envisaged that not only will the end member be engaged with the body in a manner that reduces or eliminates the accidental or unwanted removal of the end member from the body, but it may also serve to prevent fluid from leaking or flowing between the end member and the body. This may assist in maintaining fluid pressure within the device, ensuring the desired flow-rate of fluid through the device and/or reducing or eliminating wear or damage to components of the device.

The sealing engagement between the end member and the body may be achieved using any suitable technique. However, in a preferred embodiment of the invention one or more sealing members may be located between the end member and the body, the one or more sealing members being configured to form a seal therebetween. Any suitable sealing members may be used, such as one or more gaskets, O-rings or the like. The sealing members may be fabricated from any suitable material, although in a preferred embodiment of the invention the sealing members may be fabricated from a resiliently deformable material, such as a polymeric material, rubber, or the like, or a combination thereof.

As previously stated, the flow adjustment members may be provided on the end members. In addition, the end members may be shaped so as to direct the flow of fluid into the injection assembly and/or the annular bypass flow path.

In some embodiments of the invention, the end members may be provided with a cross-sectional that differs from the cross sectional area of the annular bypass flow path. In particular, the end member located at then second end of the body may be provided with a cross-sectional area that is smaller than the cross-sectional area of the annular bypass flow path. In this way, the pressure in the annular bypass flow path may be lower than that in the region of the passageway in which the end member is located. This may result in improved mixing of the fluid exiting the injection assembly and the fluid exiting the annular bypass flow path. In turn, this may improve the distribution of the substance added to the fluid in the injection assembly to as to provide a fluid stream leaving the device that is, ideally, substantially homogenous. In addition, this may provide a tuning option for the Venturi suction rate by modifying the Venturi injector exit portion relative pressure in comparison to the Venturi portion inlet pressure.

It is envisaged that this portion of the device may function as a secondary governing/flow control area. By altering the cross-sectional area, the flow velocity may also be altered, thereby creating acceleration or deceleration of the fluid. This, in turn, increases or decreases the Venturi inlet to outlet ratio.

It is envisaged that the flow adjustment members may provide mechanical support to the Venturi section of the device. Specifically, the flow adjustment members may reduce mechanical strain on the suction port and/or a biasing member associated with the flow control portion.

Locating an end member (particularly one with flow adjustment members) in the second end of the body effectively creates a low head pressure static mixer in the device.

As previously stated, the flow control device further comprises a flow control portion adapted to control the proportion of the fluid that passes through the injection assembly in response to one or more parameters. The flow control portion may be of any suitable form. For instance, the flow control portion may include one or more gates, valves or the like. In a preferred embodiment of the invention, the flow control portion may include a valve member movable between an open condition in which the flow of fluid through the annular bypass flow path is substantially unrestricted, and a closed condition in which the flow of fluid through the annular bypass flow path is substantially precluded, or at least significantly restricted. In some embodiments, the valve member may be in the form of a piston.

In some embodiments of the invention, a valve seat may be provided in the passageway against which the valve member abuts when in the closed condition. The valve seat may be of any suitable form. For instance, the valve seat may extend inwardly from the inner surface of the passageway, such as in the form of a shoulder portion or the like against which the valve member abuts when in the closed condition. Alternatively, the body of the device may be shaped so as to include a region of reduced diameter compared to the rest of the body. In this embodiment, the valve member may abut against an inner surface of the passageway in the region of reduced diameter such that inner surface of the passageway, in use, forms the valve seat.

It is envisaged that the movement of the valve member between the open condition and the closed condition may be in response to the one or more parameters, and particularly in response to changes in the one or more parameters. Preferably, the one or more parameters relate to conditions experienced within the flow control device. For instance, the one or more parameters may include the volume of the fluid passing through the device, the velocity of the fluid passing through the device, the hydraulic pressure of the fluid passing through the device, the viscosity of the fluid, the density of the fluid, the composition of the fluid and the like.

In a preferred embodiment of the invention, the movement of the valve member between the open condition and the closed condition may be in response to at least the hydraulic pressure of the fluid passing through the device, and in particular in response to changes in the hydraulic pressure of the fluid passing through the device. In this embodiment, it is envisaged that an increase in the pressure exerted on the valve member will move the valve member towards the open condition (thereby increasing the flow of fluid through the annular bypass flow path), whereas a decrease in the pressure exerted on the valve member will allow the valve member to move towards the closed condition (and into abutment with the valve seat, if present). In the closed condition, it is envisaged that a substantial majority of the fluid entering the device may pass through the injection assembly.

Increases in the hydraulic pressure exerted on the valve member may be caused during, for instance, increases in pumping speed when a variable speed pump is used. Similarly, a decrease in the hydraulic pressure exerted on the valve member may be caused when a decrease in the pumping speed of a variable speed pump takes place.

By allowing the flow control portion to control the amount of flow through the annular bypass flow path, a substantially controlled pressure ratio across the Venturi injector may be maintained at all times. It will be understood that the term "pressure ratio" refers to the difference in pressure between the inlet side of the injector passageway and the outlet side of the injector passageway. Ensuring a substantially controlled pressure ratio across the Venturi injector results in substantially controlled addition of the substance to the fluid through the suction port. It will be understood that by substantially controlled addition, it is envisaged that the device may be operated to provide a constant mix ratio of additive to motive fluid. Alternatively, the device may be operated to provide a constant injection rate of additive over time. In this embodiment it is envisaged that the additive injection rate may remain substantially constant regardless of the flow rate of the motive fluid. Thus, a changing mixture ratio (but substantially constant volumetric injection rate) may be provided.

In some embodiments of the invention, this may be achieved through the presence of a tension adjustment mechanism. Any suitable tension adjustment mechanism may be provided, although it is envisaged that the tension adjustment mechanism may be adapted to adjust the tension of one or more biasing members associated with the valve member.

As previously stated, the valve member may be associated with one or more biasing members. It is envisaged that movement of the valve member between the open condition and the closed condition may be controlled by movement of the one or more biasing members in response to the one or more parameters. It is envisaged that the biasing members may be associated with the valve member in such a manner that the natural bias of the one or more biasing members biases the valve member towards the valve seat. Thus, in this embodiment of the invention, the pressure exerted on the valve member must be sufficient to overcome the natural bias of the biasing members in order to move the valve member away from the valve seat (if present) towards the open condition, preferably at a controlled and/or pre-determined rate.

The biasing members may be of any suitable form, although in a preferred embodiment of the invention, the biasing members comprise springs, and in particular coil springs. More specifically, the biasing members may comprise helical coil springs in compression or tension. In this embodiment of the invention, the valve member may be at least partially received within the coil of the spring. In addition, it is envisaged that a portion of the injection assembly may also be received within the coil of the spring.

In some embodiments of the invention, it is envisaged that the valve member may be substantially annular in cross-section. Thus, it is envisaged that the valve member may comprise an opening therein or bore therethrough. Preferably, at least a portion of the injection assembly is received in the opening or bore such that, in use, the valve member is adapted for movement relative to the injection assembly. Preferably, the movement of the valve member is substantially parallel to the direction of flow of the fluid through the device.

In embodiments of the invention in which the second end of the device is provided with an end member, the biasing member may abut the end member so as to substantially preclude movement of the biasing member relative to the body (other than the compression of the biasing member in response to the one or more parameters).

Alternatively, the device may include one or more sensors adapted to measure the one or more parameters. Preferably, the one or more sensors measure the one or more parameters in real-time so that the position of the valve member may be adjusted dynamically in response to the measurements of the one or more parameters. It is envisaged that the one or more sensors may be operatively associated with an actuator (such as a mechanical actuator) that may in turn be operatively associated with the valve member. In this embodiment, the actuator may be actuated to adjust the position of the valve member between the open and closed conditions based on the measurements taken by the one or more sensors. In a particular embodiment, the one or more sensors may comprise pressure sensors. In this embodiment of the invention, it is envisaged that the one or more biasing members may not be required.

The present invention provides numerous advantages over the prior art. For instance, the present invention represents a reduction in the size of the device in comparison to conventional Venturi injector bypass installations. In addition, the present invention involves less capital cost, fewer parts and requires less ongoing maintenance than conventional Venturi injector bypass installations. Further, the present invention provides improved mixing/mass transfer while also reducing or eliminating fluid leakage through the suction port, and particularly during the specific condition in which there is a relatively low head pressure but no flow.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

FIG. 1 illustrates a Venturi pressure bypass installation 10 according to the prior art. In the installation 10, fluid flows through pipe 11 in the direction of arrow 12. A portion of the fluid is directed through bypass 13 which includes a Venturi injector 14. A substance is drawn into the Venturi injector 14 through a line 15 connected to the injector 14 under vacuum suction created by the flow of fluid through the injector 14.

Fluid passing through the bypass 13 is reintroduced to the main fluid stream passing through pipe 11 at junction 16 after which the mixed fluid flows out of the installation 10 in the direction of arrow 17.

Installations 10 such as that shown in FIG. 1 suffer from numerous drawbacks. Firstly, as can be seen, the installation 10 requires a relatively large footprint due to the presence of the bypass 13. This also means that additional parts are required to construct the installation 10, leading to longer assembly times. Further, the reintroduction of the stream passing through the bypass 13 with the main stream in pipe 11 does not always provide sufficient mixing of the streams so as to form a substantially homogenous stream leaving the installation 10.

Further, installations such as that shown in FIG. 1 installations are unable typically to maintain an ideal pressure ratio across the Venturi if the motive flow speed or pressure changes significantly, such as when used in conjunction with a variable speed pump.

Figure 2:
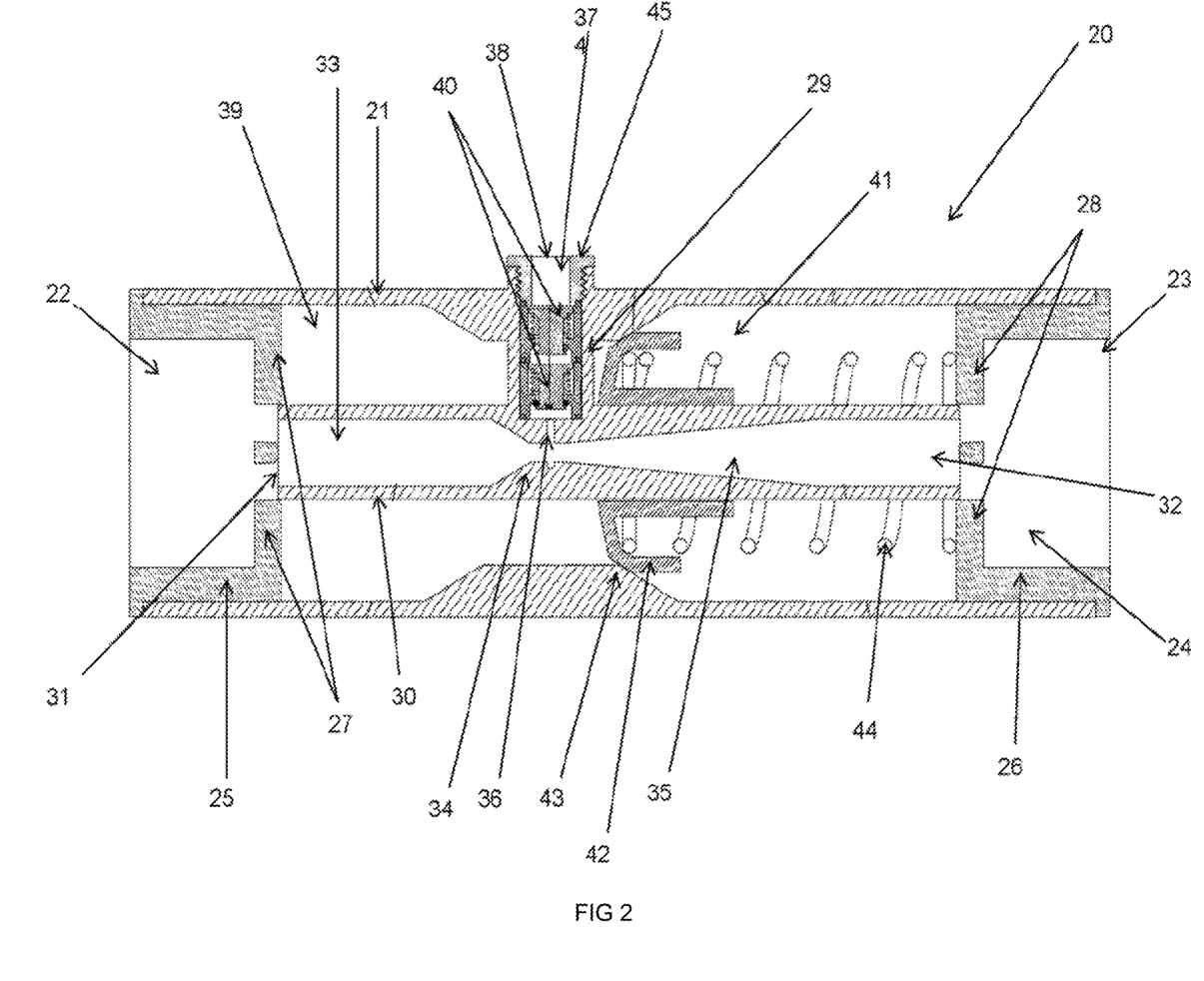
FIG. 2 illustrates a cross-sectional view of a flow control device according to an embodiment of the present invention.

FIG. 2 illustrates a cross-sectional view of a flow control device 20 according to an embodiment of the present invention. The device 20 comprises a substantially tubular body 21 having an inlet 22 at a first end and an outlet 23 at an opposed second end. A linear passageway 24 extends between the inlet 22 and the outlet 23.

A first end member 25 is provided adjacent the inlet 22, while a second end member 26 is provided adjacent the outlet 23. The end members 25, 26 are retained within the passageway 24 against an inner surface of the body 21 using an adhesive (such as a glue). The first end member 25 is provided with flow adjustment members 27 that assist in reducing turbulence in the fluid entering the device 20 through the inlet 22. Conversely, the second end member 26 is provided with flow adjustment members 28 that increase the turbulence in fluid leaving the device 20 through the outlet 23 so as to enhance mixing/mass transfer in the fluid.

The device 20 further comprises an injection assembly 29. In the embodiment of the invention illustrated in FIG. 2, the injection assembly 29 is formed integrally with the body 21.

The injection assembly 29 essentially comprises a Venturi injector, and the injector assembly includes an injector body 30, the injector body 30 having an injector inlet 31 at a first end thereof, an injector outlet 32 at an opposed second end thereof, and an injector passageway 33 extending between the injector inlet 31 and the injector outlet 32. In FIG. 2, the injector passageway 33 is positioned substantially co-axially with the passageway 24 such that an annular bypass flow path 39 is formed between the outer surface of the injector body 30 and the inner surface of the body 21.

The injector passageway 33 includes a constricted portion 34 between the injector inlet 31 and the injector outlet 32 and an expanding portion 35 between the constricted portion 34 and the injector outlet 32. The construction of this portion of the injection assembly 29 is conventional, and is adapted to create conditions under which a substance is drawn into the injector passageway 33 under vacuum suction through suction port 36. The substance, which may be a gas, liquid or even a solid (in the form of a powder or particulate) is drawn from a source (not shown) of the substance which is retained in fluid communication with an injector inlet 37 that includes an opening 38 formed in the body 21 through which the substance passes before it is introduced to, and mixed with, the fluid flowing through the injector passageway 33.

At least a portion of the fluid that enters the device 20 through the inlet 22 passes through the injector passageway 33. Any fluid that does not pass through the injector passageway 33 passes along the annular bypass flow path 39. As the fluid passing along the annular bypass flow path 39 reaches the flow adjustment members 28 of the second end member 26, additional turbulence is created, thereby enhancing the mixing of the fluid passing along the annular bypass flow path 39 and the fluid leaving the injector outlet 32 prior to the mixed fluid exiting the device 20 through the outlet 23.

The injector inlet 37 is provided with a pair of check valves 40 that are positioned on top of one another within the injection inlet. The check valves 40 are adapted to minimise or preclude the flow of any fluid from the injector passageway 33 that passes through the suction port 36 from exiting the device 20 through the opening 38. The features of the check valves 40 will be discussed in more detail in relation to FIG. 5.

The injector inlet 37 is further provided with a retention member 45. The retention member 45 is retained in screwthreaded engagement with the injector inlet 37 and serves to substantially preclude movement of the check valves 40 relative to the injector inlet 37. In addition, in some embodiments of the invention, the retention member 45 may be adapted for connection to a pipe, hose or the like through which the substance may pass into the flow control device 20.

The flow control device 20 is provided with a flow control portion 41 adapted to control the proportion of the fluid that passes through the injection assembly in response to one or more parameters. The flow control portion 41 includes a valve member in the form of a piston 42 moveable between a closed condition (as shown in FIG. 2) in which the piston 42 abuts against a valve seat 43, thereby reducing or precluding fluid from flowing through the annular bypass flow path 39 past the valve seat 43, and an open condition in which fluid can readily pass along the annular bypass flow path 39 between the inlet 22 and the outlet 23.

The piston 42 is annular in shape and includes a bore therethrough. The injector body 30 is adapted to be received at least partially in the bore, and the piston 42 is adapted to move relative to the injector body 30 between the open condition and the closed condition.

The piston 42 is operatively associated with a coil spring 44, the coil spring 44 having a natural bias that biases the piston 42 towards the closed condition in which the piston abuts the valve seat 43. The coil spring 44 abuts the second end member 26 such that movement of the coil spring 44 relative to the body 21 is substantially precluded, other than the movement caused by the compression of the coil spring 44 as the piston 42 moves towards the open condition.

The movement of the piston 42 between the open and closed conditions occurs in response to one or more parameters, the one or more parameters being conditions experienced within the device 20. In the embodiment of the invention shown in FIG. 2, the movement of the piston 42 occurs in response to the hydraulic pressure exerted on the piston 42 by fluid entering the device 20 through the inlet 22.

As the hydraulic pressure exerted on the piston 42 increases (for instance, due to increased fluid volume, fluid velocity etc.), the hydraulic pressure will reach a level that overcomes the natural bias of the coil spring 44, and the piston 42 will move out of the closed condition towards the open condition. As the piston 42 moves out of the closed condition, fluid may flow along the annular bypass flow path 39 past the valve seat 43 towards the outlet 23.

Figure 3:
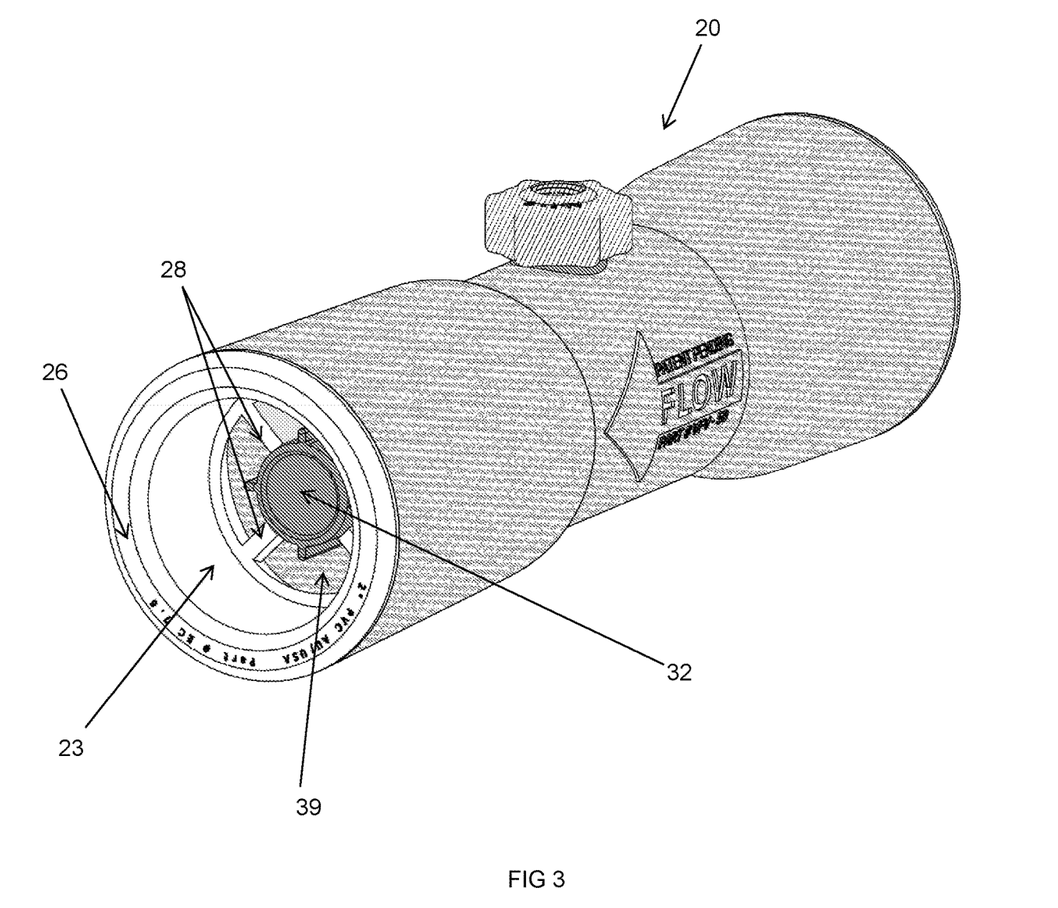
FIG. 3 illustrates an isometric view of a flow control device according to an embodiment of the present invention.
Figure 4:
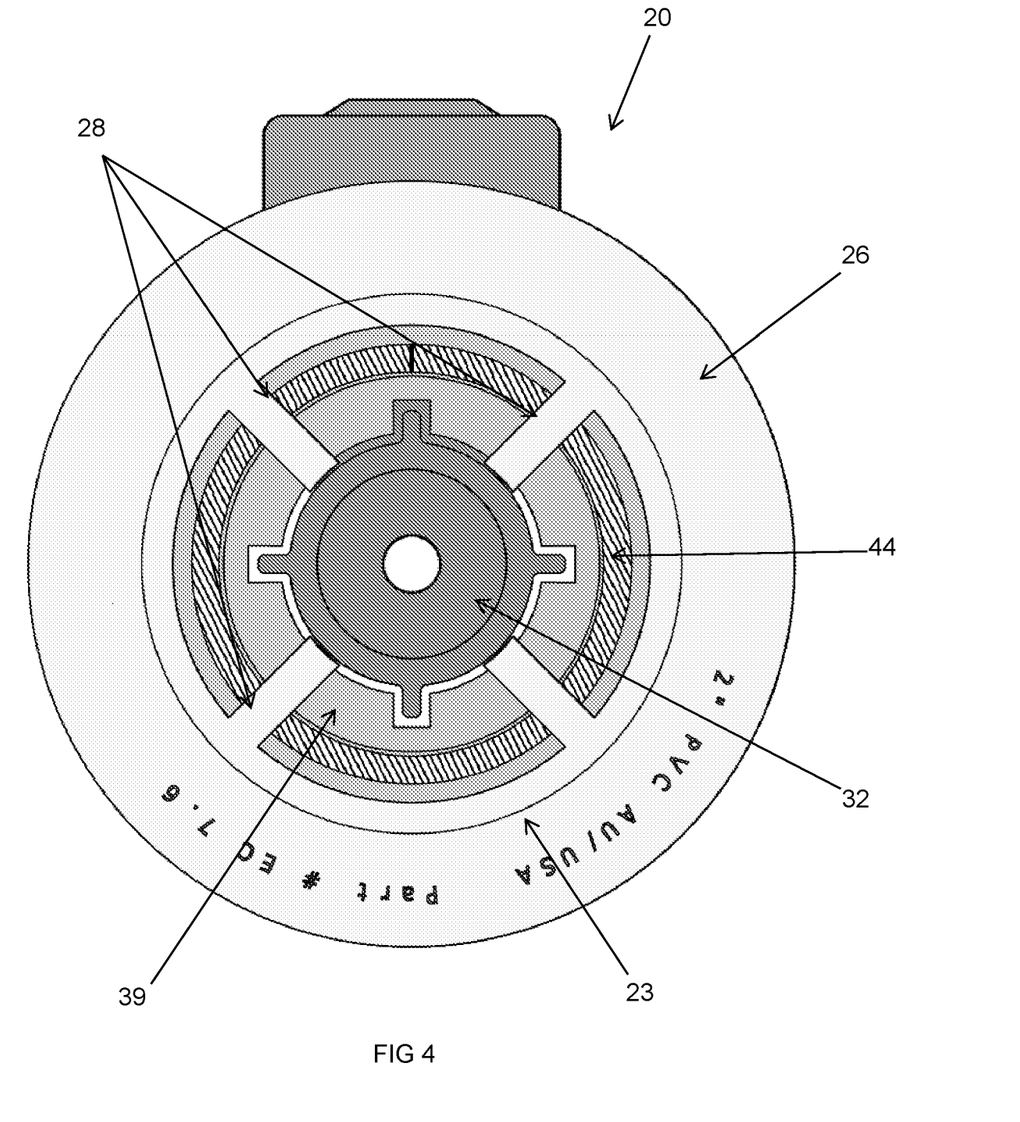
FIG. 4 illustrates an end view of a flow control device according to an embodiment of the present invention.

FIGS. 3 and 4 illustrate an isometric view and end view, respectively, of a flow control device 20 according to an embodiment of the present invention. In these Figures, the outlet 23 of the device 20 may be more clearly seen. The end member 26 associated with the outlet 23 includes flow adjustment members 28 that create turbulence in the fluid passing along the annular bypass flow path 39 and existing the injector outlet 32, thereby enhancing the mixing/mass transfer. This is of particular advantage when the substance added to the fluid through the injection assembly (obscured) is a gas.

In FIG. 4, the coil spring 44 positioned within the annular bypass flow path 39 may be seen. In use, the coil spring 44 abuts the rear of the flow adjustment members 28 (i.e. the opposed ends of the flow adjustment members 28 to the ends visible in FIG. 4 at the outlet 23 of the device 10).

Figure 5:
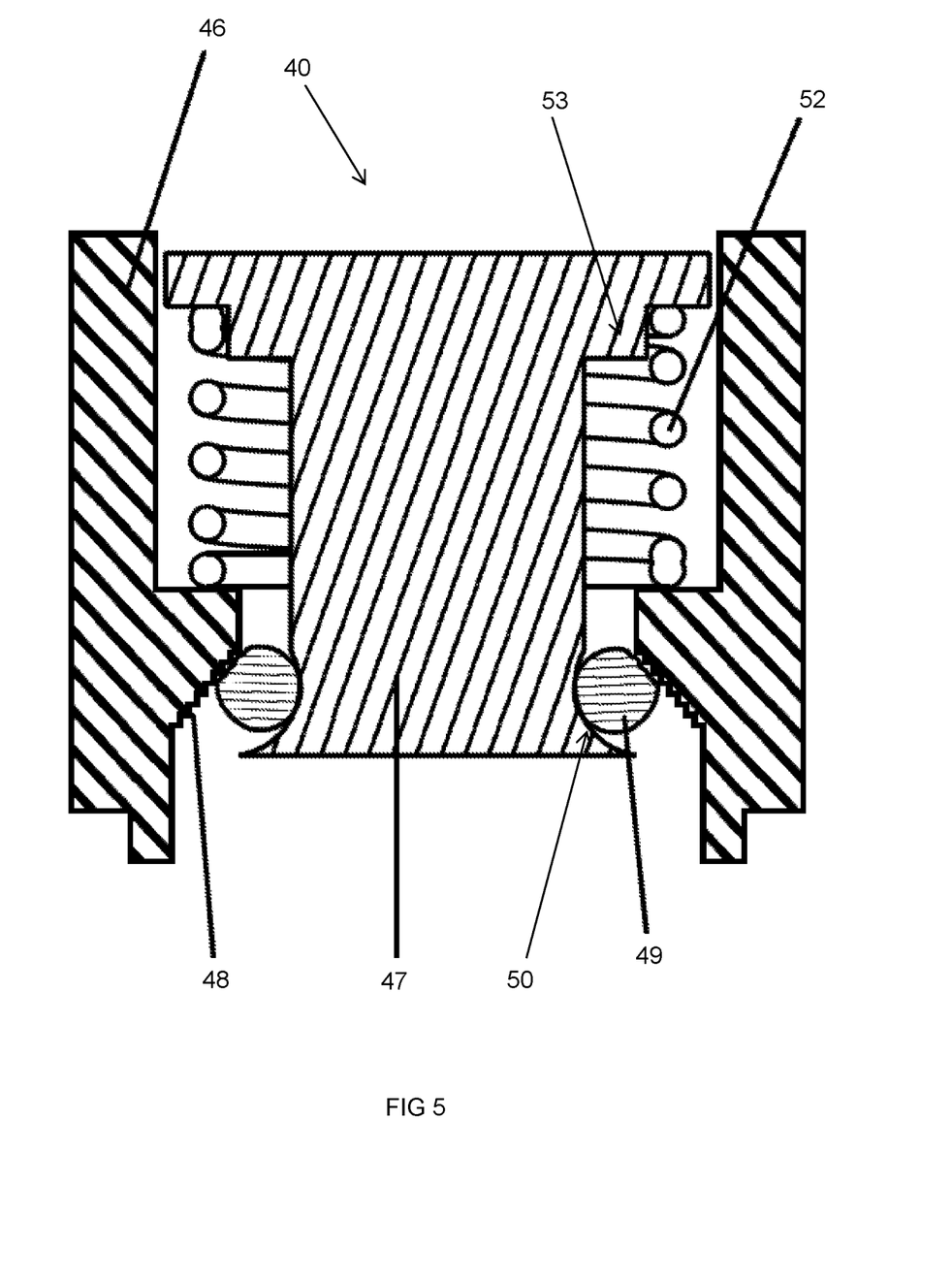
FIG. 5 illustrates a cross-sectional view of a check valve according to an embodiment of the present invention.

FIG. 5 illustrates a cross-sectional view of a check valve 40 according to an embodiment of the present invention. The valve 40 includes a valve body 46 in the form of a cylinder. A valve member in the form of a piston 47 is located within the valve body 46 and is adapted for movement relative thereto between an open position in which a gap is formed between the piston 47 and a valve seat 48 and a closed condition in which the piston 47 abuts the valve seat 48 and forms a seal thereagainst.

In the embodiment of the invention shown in FIG. 5, the piston 47 is provided with a resiliently deformable portion in the form of an O-ring 49 that is positioned annularly about the piston 47. In this embodiment, the piston 47 is provided with a receiving portion 50 having a complementary shape to the O-ring 49 so as to enhance the contact between the O-ring 49 and the piston 47.

The valve seat 48 is provided with a plurality of raised portions in the form of stepped portions 51. When the piston 47 is in the closed condition, as illustrated in FIG. 5, the O-ring 49 abuts the stepped portions 51 and deforms so as to enhance the seal between O-ring 49 and the valve seat 48. Advantageously, the pressure required to form the seal in the check valve 40 of FIG. 5 would be less than the pressure required to achieve the same degree of sealing in a valve seat in which the stepped portions 51 were not present.

The check valve 40 is further provided with a biasing member in the form of a coil spring 52. The coil spring 52 is retained at a first end thereof on an annular retention portion 53 of the piston 47, and the piston 47 is partially received within the coil of the spring 52. The natural bias of the coil spring 52 maintains the piston 47 in a closed condition. Forming the seal (with or without the assistance of back pressure) between the O-ring 49 and the valve seat 48 reduces or eliminates the leakage of fluid through the valve seat 48.

Figure 6A:
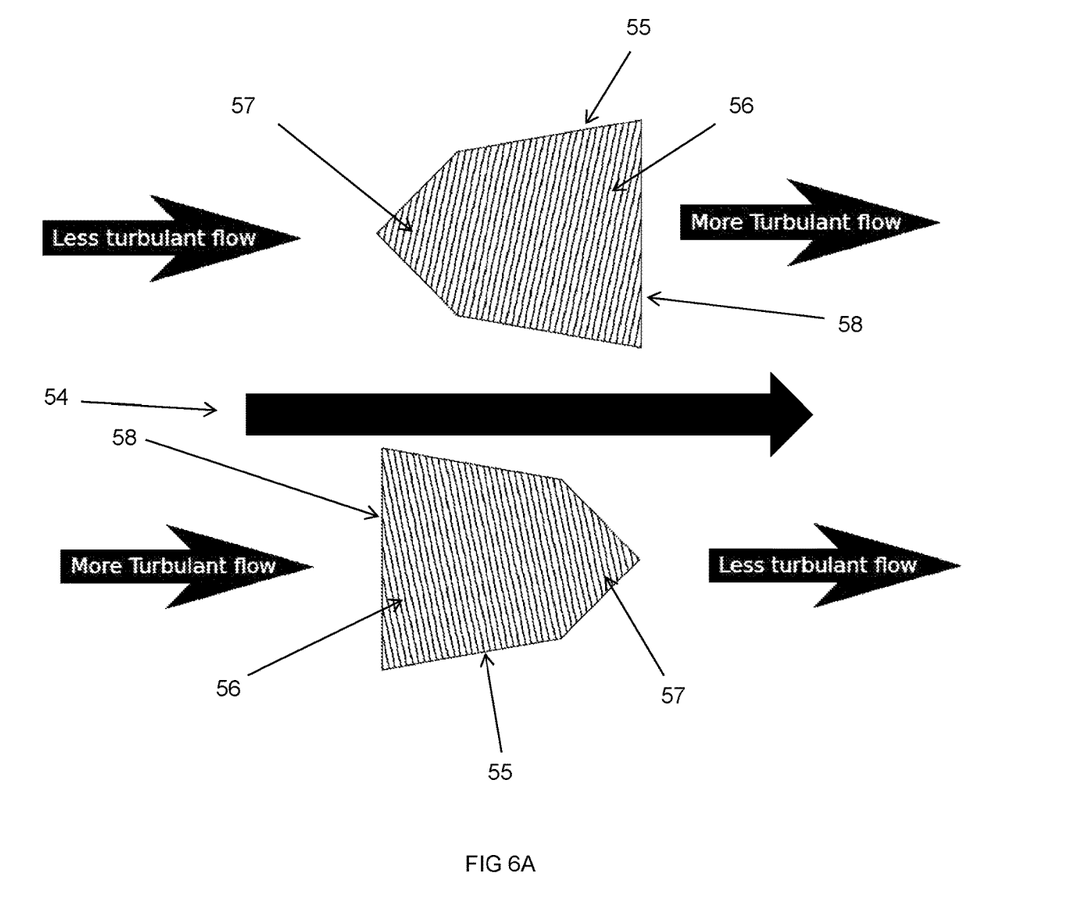
FIGS. 6A and 6B illustrate flow adjustment members used in a flow control device according to an embodiment of the present invention.
Figure 6B:
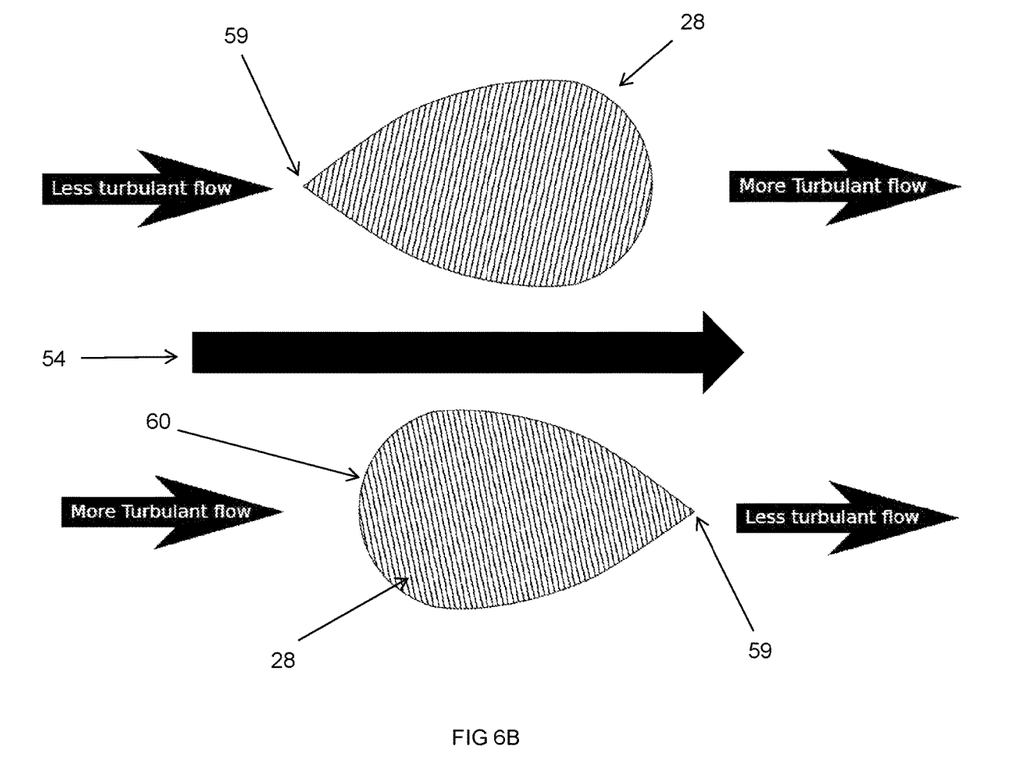

FIGS. 6A and 6B illustrate flow adjustment members 28 according to embodiments of the present invention. In these Figures, the flow adjustment members 28 are shaped so as to generate certain flow conditions in the fluid that flows over the flow adjustment members 28. In both FIGS. 6A and 6B the flow of fluid relative to the flow adjustment members 28 is represented by arrow 54.

In FIG. 6A the flow adjustment members 28 are pentagonal when viewed from the side. The flow adjustment members 28 are effectively pyramidal in shape, although with an angle change in the sidewalls 55 so that the flow adjustment members 28 form a base portion 56 and a tip portion 57. The base portion 56 includes a face 58 adapted to create turbulence in the fluid flowing over the flow adjustment member 28.

In the top half of FIG. 6A, the tip portion 57 of the flow adjustment member 28 is oriented towards the flow of fluid. When oriented in this manner, the shape of the flow adjustment member 28 causes an increase in the turbulence of fluid flowing over the flow adjustment member 28. Thus, it is envisaged that the flow adjustment member 28 may be oriented in this manner at or adjacent the outlet of the device (not shown).

In the bottom half of FIG. 6A, the orientation of the flow adjustment member 28 has been reversed such that the face 58 of the base portion 56 faces towards the direction of fluid flow. By orienting the flow adjustment member 28 in this manner, turbulence in the fluid flowing over the flow adjustment member 28 may be reduced. Thus, it is envisaged that the flow adjustment member 28 may be oriented in this manner at or adjacent the inlet of the device (not shown).

In FIG. 6B, the flow adjustment member 28 is teardrop or airfoil shaped. As with the flow adjustment member 28 of FIG. 6A, orienting the tip 59 of the flow adjustment member 28 towards the direction of fluid flow (as in the top half of FIG. 6B) results in an increase in the turbulence of the fluid flowing over the flow adjustment member 28. Thus, it is envisaged that the flow adjustment member 28 may be oriented in this manner at or adjacent the outlet of the device (not shown).

In the bottom half of FIG. 6B, the orientation of the flow adjustment member 28 has been reversed such that the rounded face 60 of the flow adjustment member 28 faces towards the direction of fluid flow. By orienting the flow adjustment member 28 in this manner, turbulence in the fluid flowing over the flow adjustment member 28 may be reduced due to a reduction in drag without reducing laminar flow stabilisation. Thus, it is envisaged that the flow adjustment member 28 may be oriented in this manner at or adjacent the inlet of the device (not shown).

Figure 7:
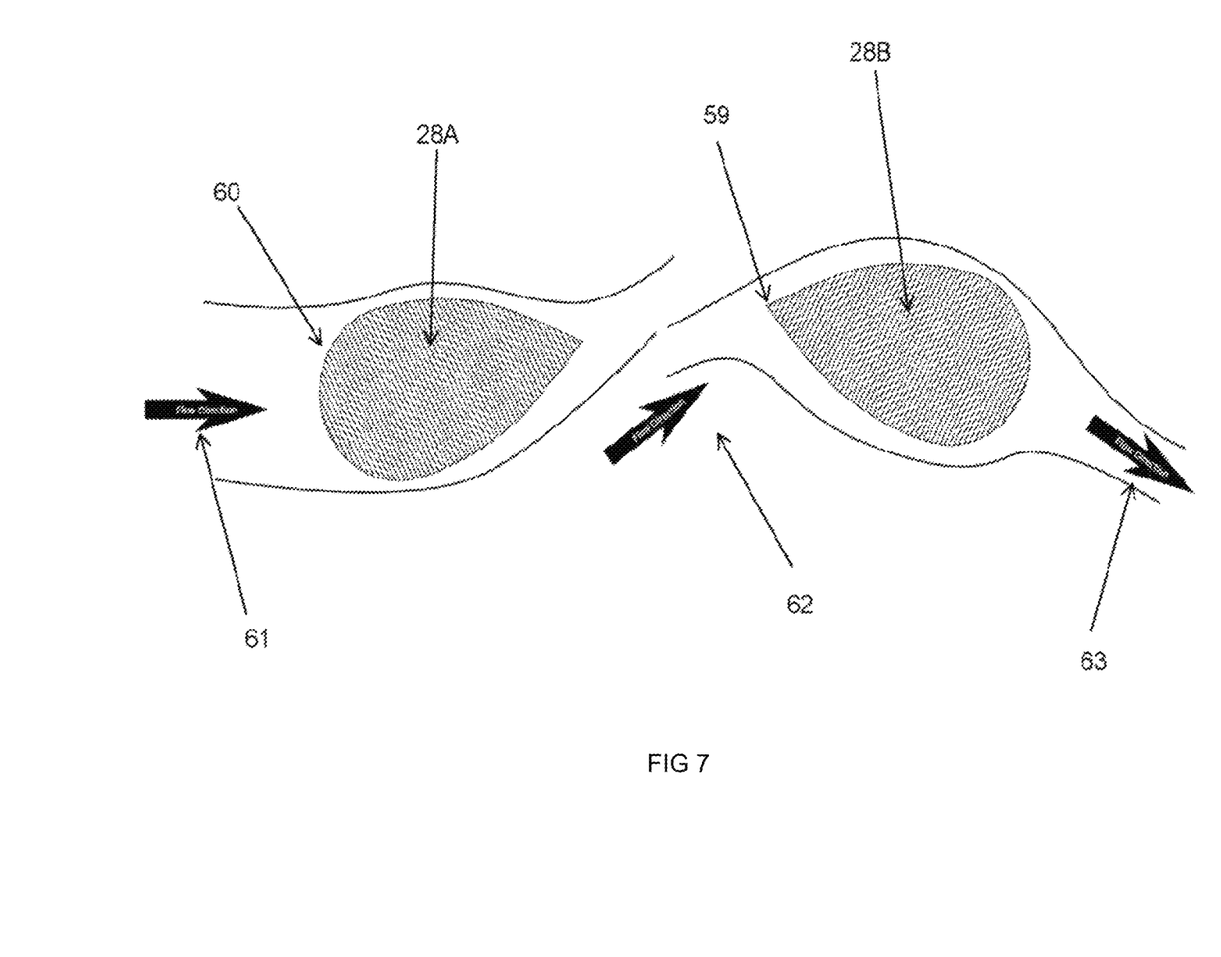
FIG. 7 illustrates flow adjustment members used in a flow control device according to an embodiment of the present invention.

FIG. 7 illustrates flow adjustment members 28A, 28B used in a flow control device (not shown) according to an embodiment of the present invention. The flow adjustment members 28A, 28B are the same as those illustrated in FIG. 6B.

In FIG. 7, the flow adjustment members 28A, 28B are angled relative to the longitudinal axis of the passageway (not shown). In particular, the rounded face 60 of flow adjustment member 28A is angled downwardly relative to the longitudinal axis of the passageway. In this way, fluid flowing over flow adjustment member 28A from the direction indicated by arrow 61 is directed upwardly by the flow adjustment member 28A. Conversely, flow adjustment member 28B is oriented such that the tip 59 is angled upwardly relative to the longitudinal axis of the passageway. In this way, fluid flowing over flow adjustment member 28B from the direction indicated by arrow 62 is directed downwardly by the flow adjustment member 28B in the direction of arrow 63.

Orienting, the flow adjustment members 28A, 28B in this manner allows for the adjustment or control of the fluid flow in order to direct more (or less) fluid through the injection assembly (not shown) and/or to adjust the friction drag coefficient for particular fluids. Adjusting the friction drag coefficient may be beneficial in that it may promote improved mixing of the fluid, for example to more evenly distribute the substance within the fluid.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A flow control device comprising:
a body having an inlet in a first end thereof, an outlet in a second end thereof, and a passageway extending between the inlet and the outlet, the flow control device further comprising:
an injection assembly located at least partially within the passageway such that at least a portion of a fluid flowing through the device passes through the injection assembly, the injection assembly including an injector body, the injector body having an injector inlet at a first end thereof, an injector outlet at a second end thereof, and an injector passageway extending between the injector inlet and the injector outlet, the injector passageway having a diameter smaller than the diameter of the passageway such that a substantially annular bypass flow path is formed between an inner surface of the body and an outer surface of the injector body, wherein the flow control device further comprises:
a flow control portion adapted to control a proportion of the fluid that passes through the injection assembly, the flow control portion comprising a valve member movable between an open condition in which the flow of the fluid through the annular bypass flow path is substantially unrestricted, and a closed condition in which the flow of fluid through the annular bypass flow path is significantly reduced or substantially precluded, and wherein movement of the valve member between the open condition and the closed condition is in response to changes in hydraulic pressure of the fluid passing through the device and results in a substantially controlled pressure ratio across the injector assembly, and the flow control device further comprising:
one or more flow adjustment members located at the first end of the body and one or more flow adjustment members located at the second end of the body, wherein the one or more flow adjustment members at the first end of the body are configured to reduce turbulence in the fluid entering the flow control device and the one or more flow adjustment members at the second end of the body are configured to increase turbulence in the fluid exiting the injection assembly and/or the annular bypass flow path.

2. A flow control device according to claim 1 wherein the body is substantially tubular between the inlet and the outlet, and wherein the passageway is substantially linear.

3. A flow control device according to claim 1 wherein the one or more flow adjustment members extend radially inwardly towards a center of the passageway from at or adjacent an inner surface of the passageway, wherein the one or more flow adjustment members are formed with an end member associated with the second end of the body, the end member being configured to maintain fluid pressure within the device.

4. A flow control device according to claim 1 wherein the injector body is located substantially parallel to the body and substantially centrally within the passageway.

5. A flow control assembly according to claim 1 wherein the injection assembly is adapted to inject a substance into the fluid.

6. A flow control device according to claim 5 wherein the injection assembly comprises a Venturi injection assembly.

7. A flow control device according to claim 6 wherein the Venturi injection assembly includes one or more injection inlets through which the substance passes to be introduced to the fluid.

8. A flow control device according to claim 7 wherein at the injection inlets are provided with one or more flow control members adapted to reduce or eliminate a possibility of fluid flowing through the injector passageway from passing through the injection inlets.

9. A flow control device according to claim 8 wherein the one or more flow control members comprise check valves.

10. A flow control device according to claim 9 wherein the check valves comprise a valve member including a resiliently deformable portion, and a valve seat provided with a plurality of raised portions, wherein the valve member is adapted for movement between an open condition and a closed condition in which the resiliently deformable portion is brought into sealing abutment with the plurality of raised portions on the valve seat.

11. A flow control device according to claim 1 wherein the valve member comprises a piston.

12. A flow control device according to claim 11 wherein a valve seat is provided in the passageway against which the valve member abuts when in the closed condition.

13. A flow control device according to claim 1 wherein movement of the valve member between the open and closed condition is in response to the one or more further parameters.

14. A flow control device according to claim 1 wherein the valve member is associated with one or more biasing members, such that movement of the valve member between the open condition and the closed condition is controlled by movement of the one or more biasing members in response to the changes in hydraulic pressure of the fluid passing through the device.

* * * * *